United States Patent [19]

Behrens et al.

[11] Patent Number: 5,087,845
[45] Date of Patent: Feb. 11, 1992

[54] SERIES ELECTRIC MOTOR WITH PERMANENT MAGNET BRAKE

[75] Inventors: Axel Behrens, Denkendorf; Walter Berwarth, Esslingen-Zell; Gerhard Fetzer, Denkendorf; Hansjörg Nothdurft, Esslingen, all of Fed. Rep. of Germany

[73] Assignee: Festo KG, Esslingen, Fed. Rep. of Germany

[21] Appl. No.: 648,220

[22] Filed: Jan. 31, 1991

[30] Foreign Application Priority Data

Feb. 16, 1990 [DE] Fed. Rep. of Germany ....... 4004785

[51] Int. Cl.$^5$ ............... H02K 7/106; H02K 13/10; H02K 23/38
[52] U.S. Cl. ...................... 310/77; 188/162; 310/68 B; 310/154
[58] Field of Search ............ 188/158, 162; 192/84 PM, 1.1, 1.21; 310/50, 77, 154, 158, 239, 241, 68 B, 72; 360/105

[56] References Cited

U.S. PATENT DOCUMENTS

| | | | |
|---|---|---|---|
| 2,199,601 | 5/1940 | Wallis | 310/158 |
| 4,056,749 | 11/1977 | Carlson, Jr. et al. | 310/239 |
| 4,399,384 | 8/1983 | Lucherini | 310/241 |
| 4,451,752 | 5/1984 | Tahara et al. | 310/186 |

FOREIGN PATENT DOCUMENTS

| | | | |
|---|---|---|---|
| 1115763 | 6/1979 | Canada. | |
| 90-2437 | 3/1990 | PCT Int'l Appl. | 310/154 |
| 963867 | 1/1963 | United Kingdom | 310/77 |
| 1119492 | 7/1965 | United Kingdom | 310/154 |

Primary Examiner—Steven L. Stephan
Assistant Examiner—D. L. Rebsch
Attorney, Agent, or Firm—Flynn, Thiel, Boutell & Tanis

[57] ABSTRACT

A series electric motor having at least one field winding on its stator and a rotor fed through a commutator and brushes, and a device for short circuiting the rotor. Between the stator and the rotor there is at least one permanent braking magnet attached to the stator. When the short circuiting device is put into operation, the permanent magnet field to drive the braking current is strictly predetermined so that a braking effect may cause no additional or harmful sparking at the brushes. The entire braking energy is then directly converted in the motor rotor and there is no necessity for an additional electronic regulating device for the braking current.

13 Claims, 5 Drawing Sheets

SERIES ELECTRIC MOTOR WITH PERMANENT MAGNET BRAKE

FIELD OF THE INVENTION

The invention relates to a series electric motor, and more particularly to a universal motor comprising a brake means, a stator having a field winding and a rotor having a commutator and brush gear, said brake means including short circuiting means for the rotor.

BACKGROUND OF THE INVENTION

In the case of such electric motors, more particularly ones of small size, it is frequently desired to have an electrical brake so that when the electric motor is turned off its rotor quickly comes to a standstill. Taking the use of such electric motors in home power tools as an example, safety requirements call for some provision to ensure that the electric motor stops rotating promptly when it has been turned off. In fact, it is frequently the case that a power tool bit such as a saw blade or a grinding wheel of a grinding tool, projects from the rest of the tool so that the same may only be put down when the electric motor has completely stopped moving. This is a further reason calling for a prompt braking effect.

In the case of one known brake device, the remanence field of the iron circuit of the electric motor is utilized to trigger braking excitation, the rotor of the motor being short circuited for braking. However, in the case of the known brake device, the ac operation means that the remanence field of the iron circuit is not always the same. The principle of operation further means that the braking action is not reproducible, because the remanence field initially causing the excitation is determined by the instant of turning off and it may be too small for the initiation of the braking operation. Furthermore, the braking torque may only be built up if the direction of the rotor or field current is reversed. If the initiating remanence field is sufficient, the build up of the field is produced with a brake current so that without regulation of the brake current high braking currents have to be commutated, this leading to sparking at the brushes and, thus too high wear of the brushes and of the commutator. In order to prevent this, it is necessary to provide an elaborate and expensive brake current regulating system.

Furthermore, a device for braking such electric motors is described in the German patent publication 3,636,555, in which the initiation of the brake regulation is performed electrically or, respectively, electronically. In the case of this known brake device as well, reversal of the field winding polarity is necessary. The initiating braking field is not constant, because the initiating electrical field, which is produced by a capacitor current, is superimposed on the remanence field so that the braking time is not regular and constant. The means for initiating and regulating the excitation is very elaborate for which reason an additional electronic assembly is necessary. The necessary power handling capacity of the excitation circuit makes it elaborate and the brake energy storage means, preferably in the form of electrolytic capacitors, has only a limited working life. In the event of failure of components of the excitation circuit, braking is no longer possible. The braking current has to be regulated in addition in order to have a predictable braking time and to check sparking at the brushes. The braking energy is converted into heat in a braking resistor so that the number of the braking operations possible in succession is limited or they make an additional cooling of the components necessary.

SHORT SUMMARY OF THE PRESENT INVENTION.

Accordingly, an object of the invention is to provide a braking device of the type initially mentioned in the case of which there is a simple and inexpensive design while simultaneously a high degree of reliability during braking is ensured.

A further object of the invention is to provide such a system which limits brush sparking.

In order to achieve these or other purposes in the invention, at least one permanent brake magnet is secured to the stator so as to be between the stator and the rotor.

The energy required for braking, that is to say, the energy necessary for the initiation of braking, is made available by permanent magnet means so that a constant braking field and, therefore, predictable, regular braking operations are possible. Electronic components, whose failure would render a braking operation impossible, are not necessary and not involved. The necessary braking magnets are able to be produced at a low price. Any initial reverse force effect of the rotor, more particularly at high speeds of rotation of the motor, causes the braking current to rise slowly in addition as a side-effect. Furthermore the entire braking energy is converted directly in the motor rotor and not in an additional brake resistor in accordance with the initially mentioned prior art. The rotor normally has a large surface conducive to cooling and a very large thermal capacity and furthermore it is cooled in many motors.

The use of such a braking device is found to be particularly suitable in the case of universal motors, whose brushes are displace in relation to a geometrically neutral zone, namely a zone or region between the stator poles, opposite to the direction of rotation, since in this case a particularly simple arrangement of the braking magnets is possible and brush sparking is prevented. In order to produce the highest possible field strength and therefore a high braking current, the braking magnet conveniently has a very small gap between it and the rotor.

It is found to be particularly convenient to arrange the one or more braking magnets between two stator poles. This leads to simple means for the attachment thereof in a commercially available electric motor without further modification.

A particularly powerful magnetic field may be produced by the arrangement of two mutually opposite braking magnets placed in the geometrically neutral zone, the respectively inwardly directed ends of the braking magnets having opposite magnetic poles. It is possible to ensure minimum brush sparking if only one braking magnet is positioned in the geometrically neutral zone, the direction of the permanent magnetic field, predetermined by the pole arrangement of the braking magnet, being preferably directed during one half cycle of the ac supply opposite to the main motor field direction in that angular range, in which that brush is arranged, through which in this half cycle a current flows to the commutator. In the case of rotation of the motor in the clockwise direction, the north pole of the braking magnet is adjacent to the rotor and in the case of rotation of the motor in the counterclockwise direction, the south pole of the braking magnet is adjacent to the rotor.

The short circuiting means is preferably a controlled switch, which is closed in the non-excited condition and which shunts the rotor. This switch is preferably in the form of a relay. The braking operation is then automatically initiated in the current-free state, there being the particular advantage that such braking operation is also performed in the event of line supply failure.

BRIEF DESCRIPTION OF THE DRAWINGS

The invention will now be described in more detail with reference to the accompanying drawings, which show several working embodiments thereof.

DETAILED DESCRIPTION

Figure 1:
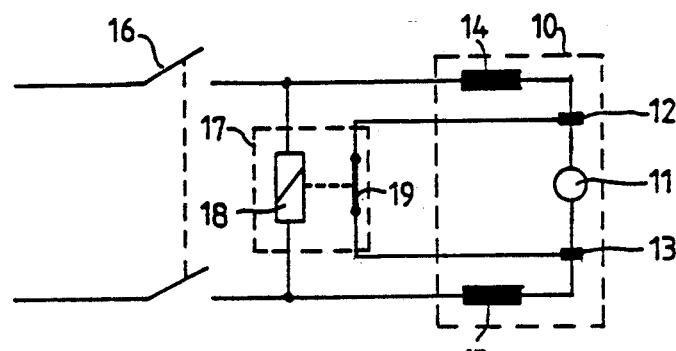
FIG. 1 shows a diagrammatic schematic of a universal motor with a short circuiting means.

FIG. 1 diagrammatically shows a universal motor 10 which has a rotor 11, whose power supply is via two brushes 12 and 13 and a commutator, not illustrated. The type of power or current supply is conventional, at least in the case of all universal motors. Two field windings 14 and 15 are respectively connected at one terminal with one of the brushes 12 and 13, while the respectively other terminal is connected with a two-way switch 16, by way of which the universal motor 10 may be supplied with ac.

As a short circuiting means, a power relay 17 is provided, whose relay winding 18 is connected via the switch 16 with the supply ac so that switching on and off is possible, while in the non-energized condition of the relay 17, a relay switching means 19 connects the two brushes 12 and 13 together. The relay is thus in the form of a normally energized or open relay.

Figure 2:
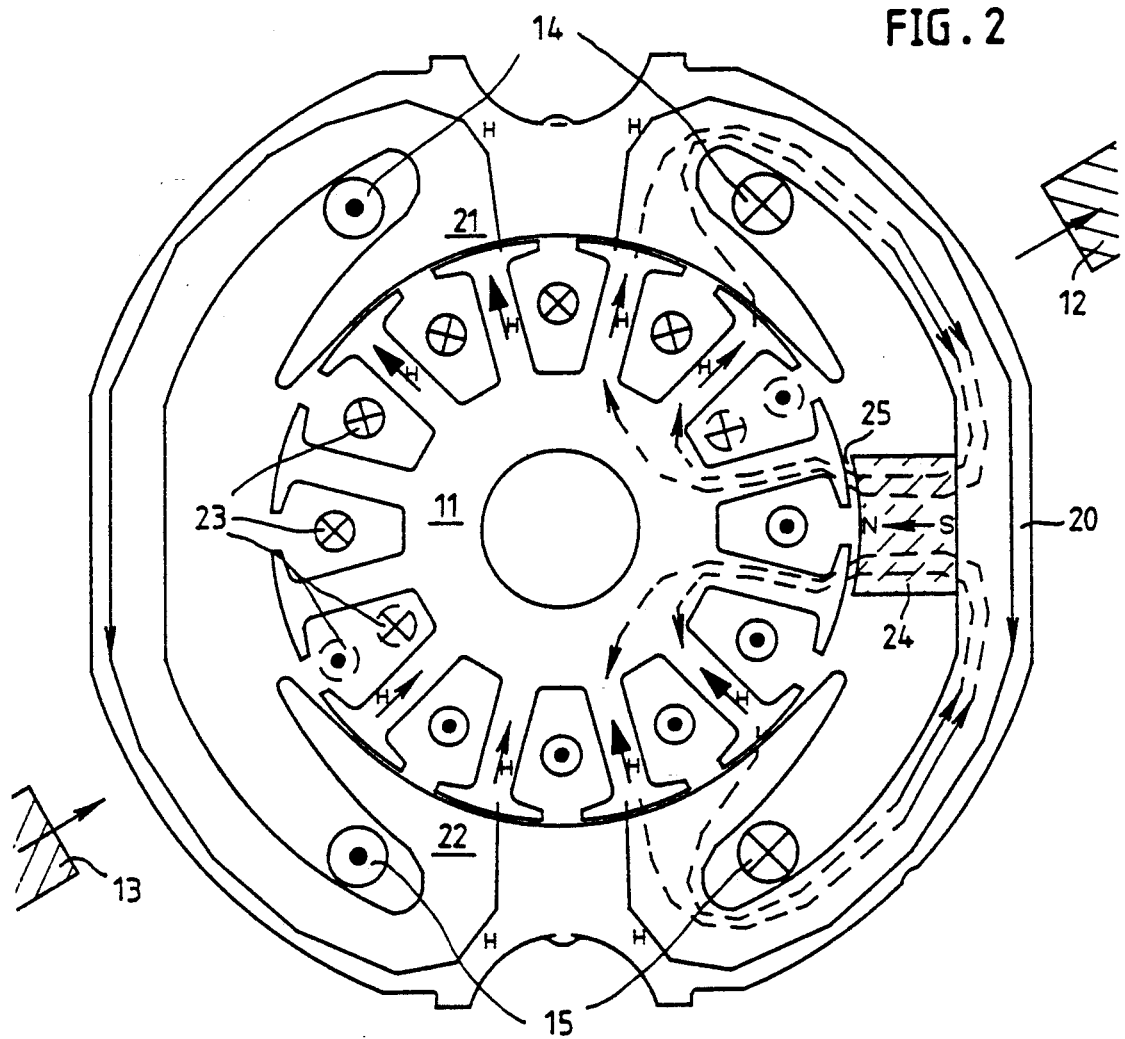
FIG. 2 shows a universal motor with a braking motor in one of the geometrically neutral zones during one voltage half cycle as a first embodiment of the invention.
Figure 3:
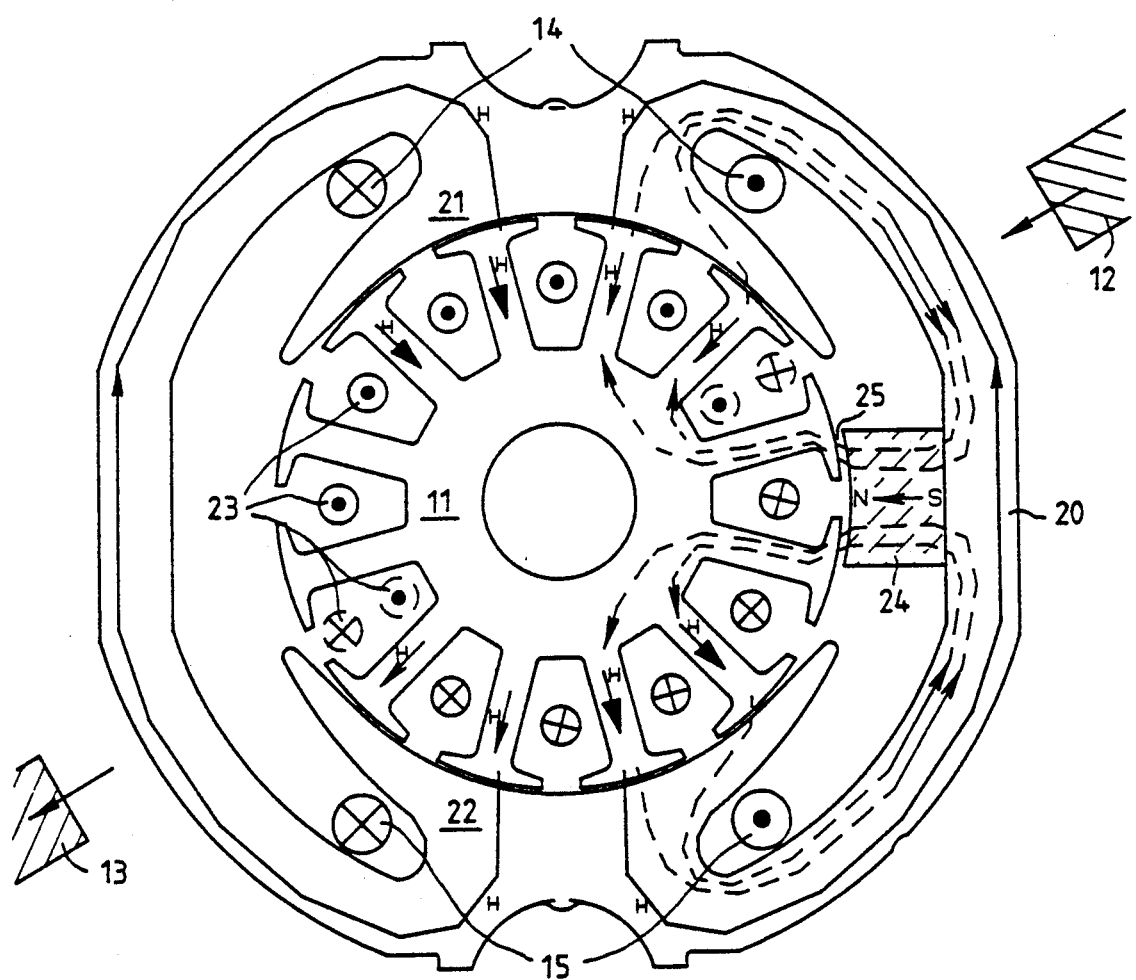
FIG. 3 shows the first working embodiment as illustrated in FIG. 2 during the other half cycle.

In the case of the first working embodiment of a universal motor illustrated in FIGS. 2 and 3, an essentially tubular stator 20 has two inwardly pointing stator poles 21 and 22, between which the rotor 11 turns. The two field windings 14 and 15 are placed on the stator poles 21 and 22. The rotor 11 is provided with a conventional field winding 23, the supply of power being via the two brushes 12 and 13 and a commutator, not illustrated. The two brushes 12 and 13 are only illustrated diagrammatically in FIGS. 2 and 3 with respect to their angular position in relation to the geometrically neutral zones of the excitation member, such zones being between the stator poles 21 and 22. In the case of one practical embodiment of the invention, these brushes 12 and 13 are naturally offset radially inwards and are in engagement with the commutator, the same being mounted on the rotary shaft.

In the geometrically neutral zone on the right hand side, a braking magnet 24 is attached to the stator 20 between the stator poles 21 and 22 to define a very small gap 25 between it and the rotor 11. The north pole (N) of the braking magnet 24 is adjacent to the rotor 11, while the south pole (S) is in engagement with the stator 20.

A braking operation is started by short circuiting the rotor. This may be performed by opening the switch 16. In both cases, the relay switch member 19 is closed and it connects the two brushes 12 and 13 with each other, this leading to a short circuiting of the rotor winding 23. The initiation of the braking operation is not accompanied by undesired and damaging sparking at the brushes, because the field driving the braking current is predetermined by the braking magnet 24 so that furthermore it is possible to ensure a predetermined braking current. In addition to this, it is possible to cause a delayed rise in the braking current as a side effect in the case of high operational speeds of the motor. Accordingly, the entire braking energy is directly converted in the motor rotor.

At first sight, it might appear that the arrangement of the braking magnet 24 in the geometrically neutral zone would impair proper commutation during normal operation of the motor since an additional field is produced by the braking magnet 24 in the neutral zone. Interference with commutation would lead to greater sparking at the brushes. Universal motors with a preferred direction of rotation, however, have a greater or lesser displacement of the brushes opposite to the direction of rotation in order to improve commutation of the rotor winding 23. This is symbolically indicated by the angular setting of the brushes 12 and 13, the universal motor illustrated in FIGS. 2 and 3 being designed to turn in the clockwise direction. Owing to this offset of the brushes, commutation under the influence of the additional permanent magnet field does not take place or only takes place to a small extent. This will be explained with reference to the illustrated magnetic fields. In this case, the main field H is marked by full lines, while the permanent magnet field due to the braking magnet 24 is indicated by chain lines. The individual arrows in the rotor 11 indicate the respective direction and strength (by means of the line width) of the principal field H. In the field windings 14 and 15 and in the individual parts of the rotor winding 23, the respective direction of the current is marked by a dot or, respectively, a cross as the opposite current direction.

For the instantaneous value of a negative voltage half cycle from the line in accordance with FIG. 2, the current will flow out of the commutator to the brush 12. The field of the braking magnet 24 will amplify the weak principal field at this point, this however only leading to normal brush sparking owing to this current direction. The condition during a positive line half cycle is illustrated in FIG. 3. The current from the brush 12 flows into the commutator, but however the field of the permanent braking magnet 24 will attenuate the principal field which is weak here. The effect of the braking magnet 24 on the other brush 13 is negligible. The above account will show that there is never any heavy brush sparking during normal operation of the universal motor 10 so that the arrangement of the braking magnet 24 does not produce any substantial undesired effect during such normal operation.

The direction of magnetization of the braking magnet 24 necessary for satisfactory operation is dependent on the direction of rotation of the motor. If the motor turns in the counterclockwise direction, opposite polarity of the braking magnet 24 would be required, there then being or having to be an offset of the brushes in a conventional way opposite to the other direction of rotation.

Figure 4:
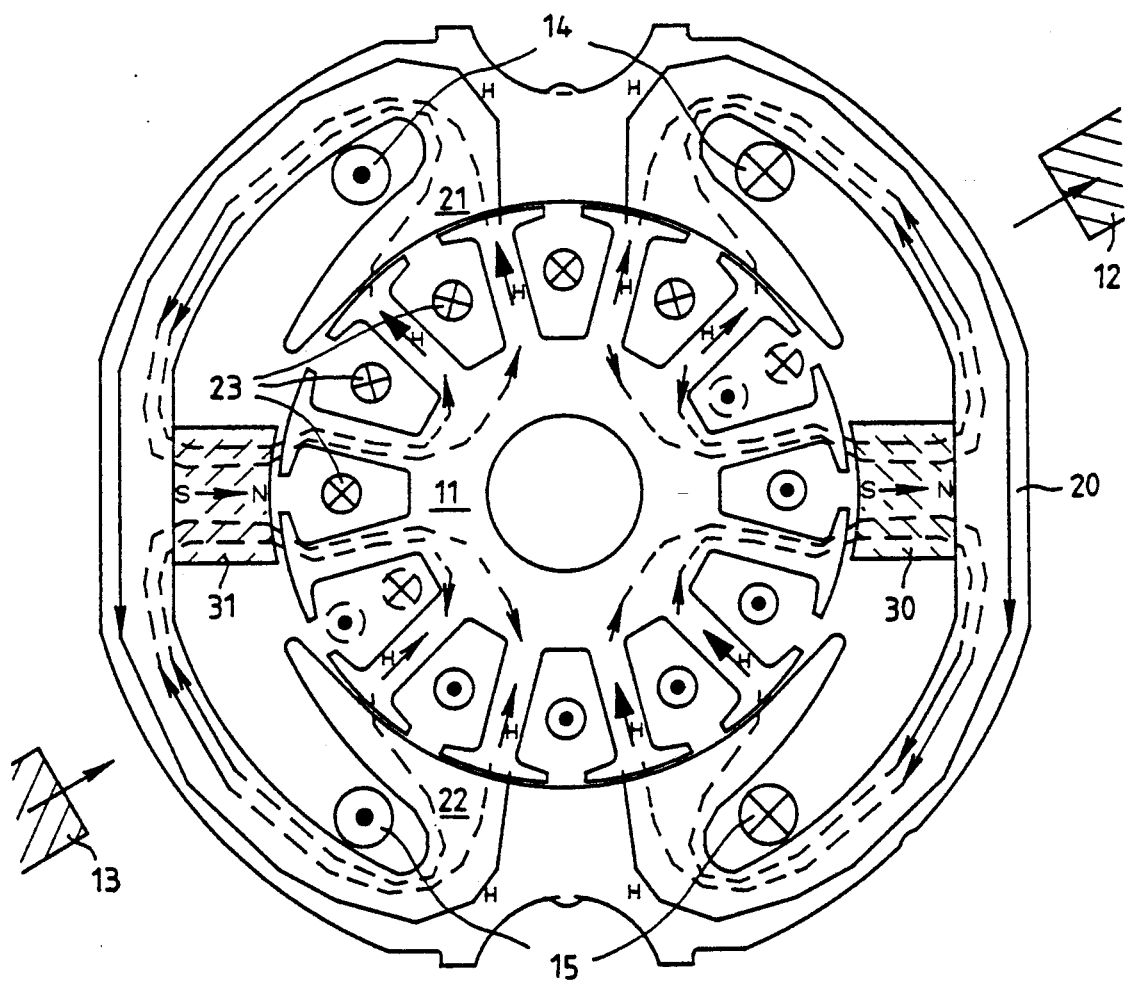
FIG. 4 shows a universal motor with two braking magnets in the geometrically neutral zone as a second working embodiment during one voltage half cycle.
Figure 5:
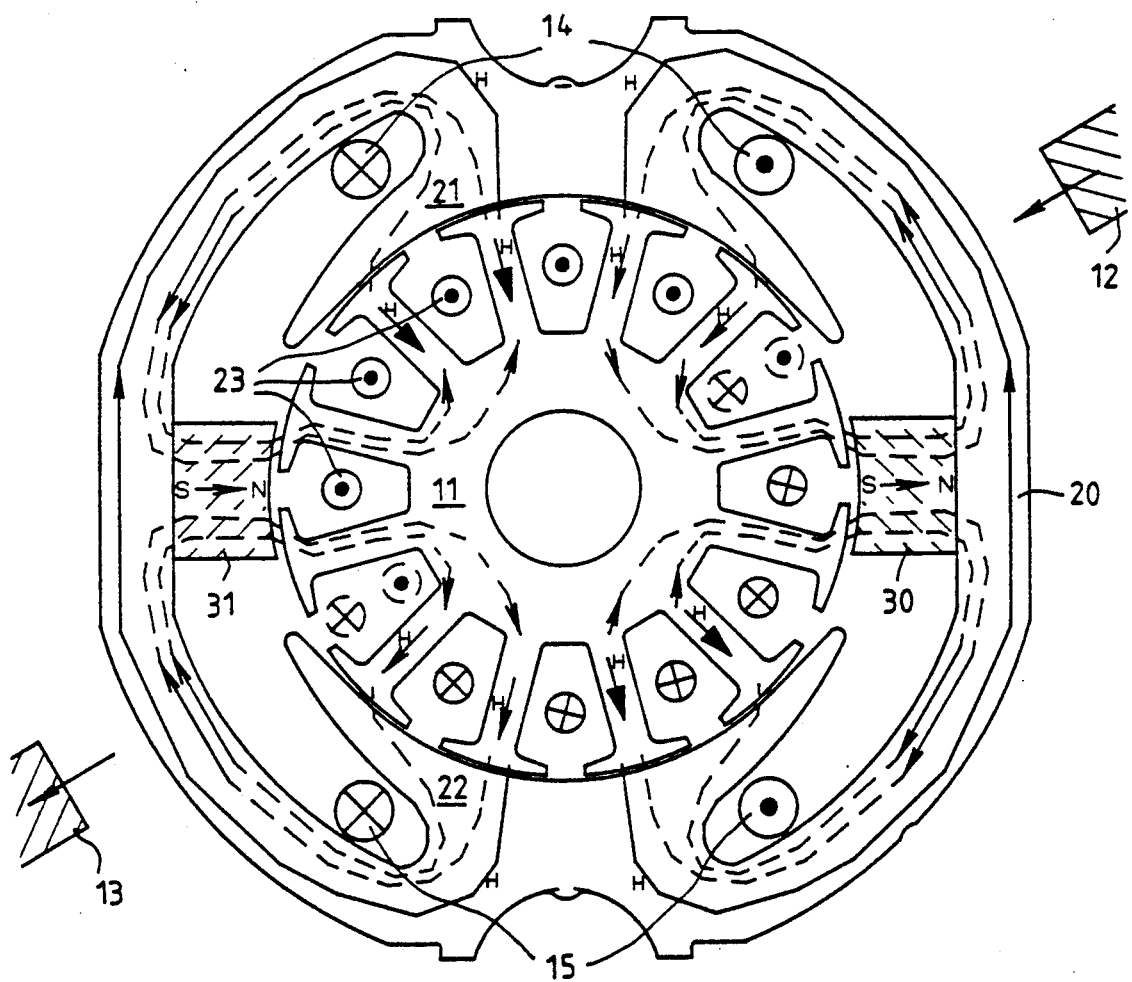
FIG. 5 shows the second working embodiment of FIG. 4 during the other voltage half cycle.

The second working embodiment illustrated in FIGS. 4 and 5 is generally similar to the first embodiment of the invention, in which respect like parts are denoted by like reference characters and they are not described a second time over. In place of the one braking magnet, there are now two braking magnets 30 and 31, which are both positioned in the geometrically neutral zones of the excitation member opposite to each other on the stator 20. In the case of the braking magnet 30 in the right hand geometrically neutral zone, the south pole is directed inwards and the north pole is in engagement with the stator 20, while in the case of braking magnet 31 the reverse is the case. Again it is a question of rotation of the rotor 11 in the clockwise direction.

The relationships illustrated in FIG. 4 apply for the instantaneous value of a negative voltage half cycle. The current flows from the commutator to the brushes 12, the field of the permanent braking magnet 30 attenuating the weak principal field here so that both for this reason and furthermore owing to the direction of the current to the brushes there are no difficulties as regards commutation at the brush 12. The current flows from the brush 13 to the commutator, but however in this case as well, the principal field is attenuated by the field of the permanent braking magnet 31 so that, here as well, there is substantially no additional brush sparking.

The condition during a positive half cycle of the line voltage is illustrated in FIG. 5. The current from the brush 12 flows to the commutator and simultaneously the magnetic field of the braking magnet 30 increases the principal field which is weak at this point so that the corresponding parts of the rotor windings commutate under the resulting field, something that leads to greater brush sparking. In the case of the brush 13, there is such an increase in the field, but however here the current flows from the commutator to the brush 13, this only leading to a normal level of brush sparking.

In the case of the second brush sparking, there is therefore an increase above the sparking level to be expected in normal operation of the universal motor, but however during braking a more intense magnetic braking field is available or it is possible to use smaller or cheaper magnets.

Figure 6:
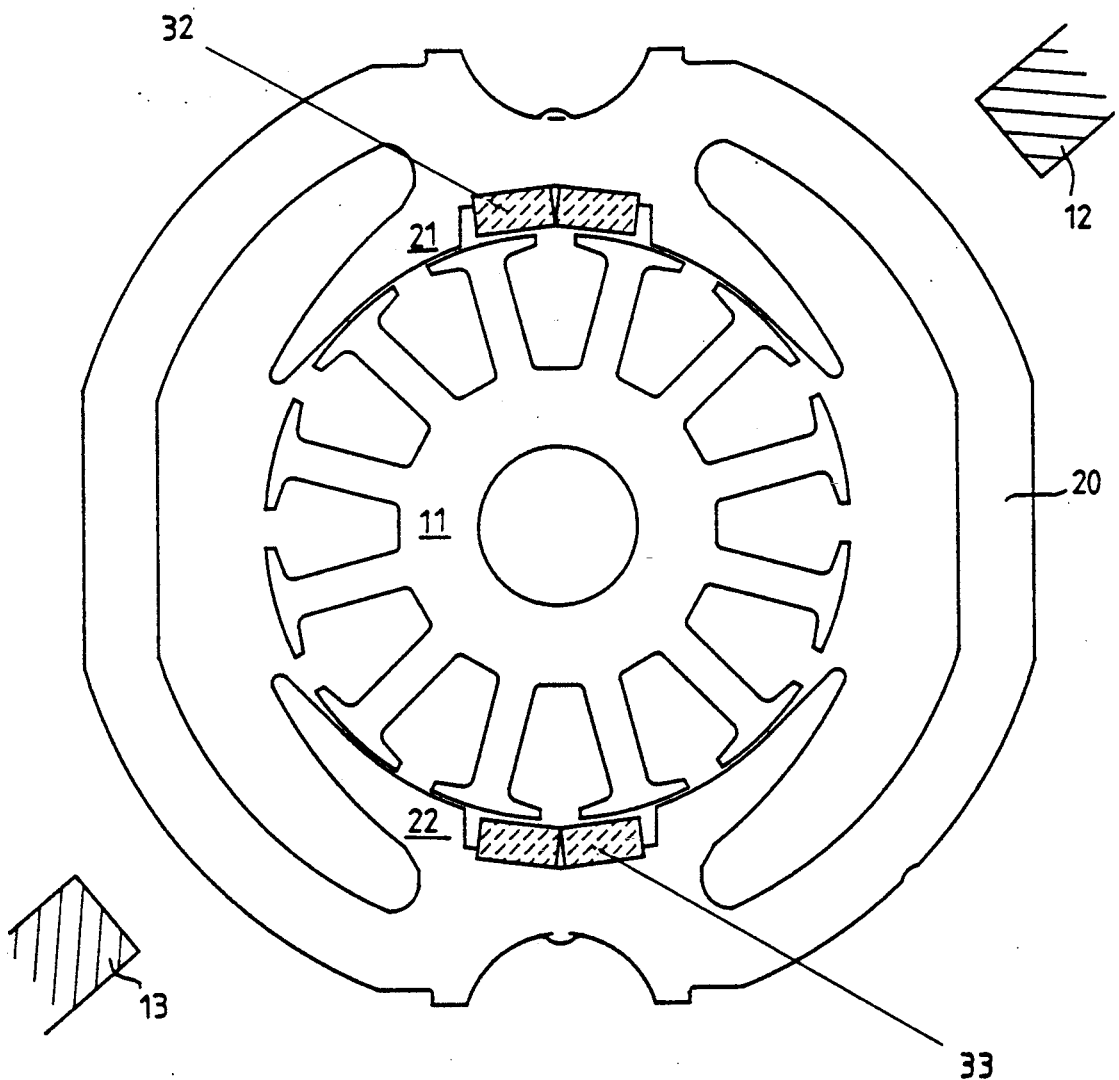
FIG. 6 shows a universal motor with two braking magnets as a third working embodiment of the invention.

In the case of the third embodiment of the invention illustrated in FIG. 6, two braking magnets 32 and 33 are provided in recesses in the stator poles 21 and 22 from the inside and are received in suitable recesses. In the case of this arrangement of the braking magnets 32 and 33 although it is possible for the increase in the air gap and thus the influence on the principal field to have an undesired effect, more particularly in the case of very small motor, it is possible to ensure a very compact arrangement. This placement of the magnet is more particularly suitable also for such motors as make attachment in the geometrically neutral zone impossible owing to shortage of space.

Furthermore, the brush system in accordance with the invention may be used not only for universal but also for other series motors.

Herein the term "short circuiting means for the rotor" is used in a sense to cover other constructions of current sinks as well, for instance a controlled semiconductor switch in a short circuiting network. In conjunction with a controlled semiconductor switch, it is in a particular case possible to provide means for regulation of the short circuited current.

The embodiments of the invention in which an exclusive property or privilege is claimed are defined as follows:

1. A series electric motor, comprising an annular stator having two radially inwardly directed stator poles and a field winding wound around each stator pole, a rotor having a rotor winding thereon which is adapted to be fed electrical energy thereto via a commutator and brushes, a short circuiting means for short circuiting the rotor winding, and only one permanent braking magnet secured to the annular stator and located between the annular stator and the rotor and oriented in a region between the two stator poles.

2. The series electric motor as claimed in claim 1, wherein said motor is in the form of a universal motor whose brushes are offset in a direction opposite to the direction of rotation from a geometrically neutral zone defined by a region on the stator equidistantly spaced from the two stator poles.

3. The series electric motor as claimed in claim 1, wherein the braking magnet is set with a very small gap between it and the rotor.

4. The series electric motor as claimed in claim 1, wherein the direction of the permanent magnet field, predetermined by a poling of the braking magnet, in one of the half cycles of the line supply is opposite to the principal field direction of the motor in the angular range in which the brush is placed and through which current flows to the commutator in this half cycle.

5. The series electric motor as claimed in claim 1, wherein said motor is in the form of a universal motor whose diametrically opposed brushes are offset in a direction opposite to the direction of rotation from a geometrically neutral zone defined by a region on the stator equidistantly spaced from the two stator poles, wherein the direction of the permanent magnet field, predetermined by a poling of the braking magnet, in one of the half cycles of the line supply is opposite to the principal field direction of the motor in the angular range in which the brush is placed and through which current flows to the commutator in this half cycle, and wherein the rotor is adapted for rotation in the clockwise direction and the north pole of the braking magnet is adjacent to the rotor.

6. The series electric motor as claimed in claim 1, wherein said motor is in the form of a universal motor whose brushes are offset in a direction opposite to the direction of rotation from a geometrically neutral zone defined by a region on the stator equidistantly spaced from the two stator poles, wherein the direction of the permanent magnet field, predetermined by a poling of the braking magnet, in one of the half cycles of the line supply is opposite to the principal field direction of the motor in the angular range in which the brush is placed and through which current flows to the commutator in this half cycle, and wherein the rotor is adapted for counterclockwise rotation and the south pole of the braking magnet is adjacent to the rotor.

7. The series electric motor as claimed in claim 1, wherein the short circuiting means includes a normally closed, controlled switch adapted to shunt the rotor winding.

8. The series electric motor as claimed in claim 1, wherein the switch is defined by a relay.

9. A series electric motor, comprising an annular stator having two radially inwardly directed stator poles and a field winding wound around each stator pole, a rotor having a rotor winding thereon which is adapted to be fed electrical energy thereto via a commutator and brushes, a short circuiting means for short circuiting the rotor, and at least one permanent braking magnet secured to the annular stator and located between the stator and the rotor and oriented in at least one of the two stator poles.

10. The series electric motor as claimed in claim 9, wherein said motor is in the form of a universal motor whose brushes are offset in a direction opposite to the direction of rotation from a geometrically neutral zone defined by a region on the stator equidistantly spaced from the two stator poles.

11. The series electric motor as claimed in claim 9, wherein the braking magnet is set with a very small gap between it and the rotor.

12. The series electric motor as claimed in claim 9, wherein the short circuiting means includes a normally closed, controlled switch adapted to shunt the rotor winding.

13. The series electric motor as claimed in claim 9, wherein the switch is defined by a relay.

* * * * *